US011772195B2

(12) United States Patent
Chapman et al.

(10) Patent No.: US 11,772,195 B2
(45) Date of Patent: Oct. 3, 2023

(54) ADDITIVE MANUFACTURING SYSTEM AND METHOD USING MULTIPLE BEAM ORIENTATIONS

(71) Applicant: THE BOEING COMPANY, Chicago, IL (US)

(72) Inventors: Eric M. Chapman, Bonney Law, WA (US); Dana A. Henshaw, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 470 days.

(21) Appl. No.: 16/854,104

(22) Filed: Apr. 21, 2020

(65) Prior Publication Data

US 2021/0323091 A1 Oct. 21, 2021

(51) Int. Cl.
*B23K 26/342* (2014.01)
*B33Y 30/00* (2015.01)
(Continued)

(52) U.S. Cl.
CPC ........ *B23K 26/342* (2015.10); *B23K 26/0604* (2013.01); *B23K 26/0876* (2013.01);
(Continued)

(58) Field of Classification Search
CPC .. B23K 26/342; B23K 26/043; B23K 26/082; B23K 26/0884; B23K 26/10;
(Continued)

(56) References Cited

U.S. PATENT DOCUMENTS

| 6,144,008 A | * | 11/2000 | Rabinovich | ............. | B22F 3/005 |
| | | | | | 219/121.64 |
| 2016/0306901 A1 | | 10/2016 | Ainsworth et al. | | |

(Continued)

FOREIGN PATENT DOCUMENTS

| EP | 3736108 A1 | * | 11/2020 | | |
| EP | 3782802 A1 | * | 2/2021 | ........... | B29C 64/386 |
| EP | 3804883 A1 | | 4/2021 | | |

OTHER PUBLICATIONS

Valerie Coffey-Rosich, Product Focus: Galvanometer Scanners: What you need to know to buy a galvo-positioner , Sep. 1, 2010, Laser Focus World, https://www.laserfocusworld.com/optics/article/16567973/product-focus-galvanometer-scanners-what-you-need-to-know-to-buy-a-galvopositioner (Year: 2010).*

(Continued)

*Primary Examiner* — Dana Ross
*Assistant Examiner* — Bryan M Badalamenti
(74) *Attorney, Agent, or Firm* — THE SMALL PATENT LAW GROUP LLC; Philip S. Hof

(57) ABSTRACT

An additive manufacturing system includes one or more processors configured to determine one or more geometrical characteristics of each of multiple segments of a build part at a candidate position relative to an additive manufacturing instrument. The one or more geometrical characteristics include an angle of incidence between a beam line extending from a beam source and a surface normal of a respective skin of the corresponding segment proximate to the beam line. The one or more processors are configured to control the additive manufacturing instrument, based on the one or more geometrical characteristics, to direct focused energy beams from a first orientation relative to the build part to form a first segment of the segments of the build part and to direct focused energy beams from a second orientation (Continued)

relative to the build part to form a second segment of the segments of the build part.

21 Claims, 7 Drawing Sheets

(51) Int. Cl.
| | | |
|---|---|---|
| *B33Y 50/02* | (2015.01) | |
| *B23K 26/06* | (2014.01) | |
| *B23K 26/08* | (2014.01) | |
| *G05B 19/402* | (2006.01) | |
| *G05B 19/4099* | (2006.01) | |

(52) U.S. Cl.
CPC ............... *B33Y 30/00* (2014.12); *B33Y 50/02* (2014.12); *G05B 19/402* (2013.01); *G05B 19/4099* (2013.01); *G05B 2219/49023* (2013.01)

(58) Field of Classification Search
CPC ...... B23K 26/702; B33Y 10/00; B33Y 30/00; B33Y 50/02; B33Y 50/00; G05B 2219/49038; G05B 2219/49039; G05B 2219/49041; G05B 19/4099; Y02P 10/25; B29C 64/153; B29C 64/40; B29C 64/268; B29C 64/393; B22F 10/40; B22F 10/80; B22F 10/28
See application file for complete search history.

(56) References Cited

U.S. PATENT DOCUMENTS

| | | | |
|---|---|---|---|
| 2017/0282246 A1 | 10/2017 | Liebl et al. | |
| 2019/0358736 A1* | 11/2019 | Levine | B33Y 10/00 |
| 2020/0139631 A1* | 5/2020 | Buller | B29C 64/393 |
| 2021/0114111 A1* | 4/2021 | Schade | B33Y 10/00 |

OTHER PUBLICATIONS

Fresnel Equations, Dec. 14, 2013, <https://web.archive.org/web/20131227214310/https://www.rp-photonics.com/fresnel_equations.html> (Year: 2013).*

Zhuoer Chen, Surface roughness and fatigue properties of selective laser melted Ti—6Al—4V alloy, 2019, Elsevier, Additive Manufacturing for the Aerospace Industry, DOI: https://doi.org/10.1016/B978-0-12-814062-8.00015-7, pp. 283-299 (Year: 2019).*

Kleszczynski et al. "Position Dependency of Surface Roughness in Parts from Laser Beam Melting Systems" 26th International Solid Free Form Fabrication (SFF) Symposium; 2015 (11 pages).

Wang et al., "Research on the fabricating quality optimization of the overhanging surface in SLM process", Int J Adv Manuf Technol (2013) 65:1471-1484 (14 pages).

European Search Report for related European Patent Application 21156337 dated Jul. 13, 2021 (12 pages).

* cited by examiner

ADDITIVE MANUFACTURING SYSTEM AND METHOD USING MULTIPLE BEAM ORIENTATIONS

FIELD OF THE DISCLOSURE

Embodiments of the present disclosure generally relate to additive manufacturing of three-dimensional build parts.

BACKGROUND

Additive manufacturing refers to any process for manufacturing a three-dimensional build part in which successive layers of base material are deposited under computerized control. The deposited layers are selectively fused via the application of a focused energy beam, such as a laser, which heats and bonds the material. The size and shape of the build part can be based on a three-dimensional computer model or another electronic data source. Additive manufacturing can be used to fabricate objects that have complex structures and shapes. Additive manufacturing techniques for fabricating metal build parts can allow greater design freedom and yield more precise and repeatable finished products than conventional metal manufacturing techniques, such as die-casting, extruding, and the like.

The set-up for an additive manufacturing build process includes selecting the design of the build part that is to be constructed, specifying the positioning of the build part on a build platform, and generating a build plan for constructing the build part according to the selected design and the specified positioning relative to the platform. The positioning can refer to the location of the build part relative to the build platform, such as relative to a center and/or to edges of the platform, as well as to an orientation of the planned build part relative to the platform, such as a rotational orientation about a vertical axis and/or an angular orientation (e.g., tilt or lean) of the build part. The build plan controls the performance of the additive manufacturing instrument during the build process. The build plan may designate a series of actions performed by the instrument and may also designate parameters and settings. With respect to the focused energy source, the build plan may provide a path along which to aim the emitted energy beams as wells as parameters of the energy beams, such as energy intensity, beam width or diameter, and the like.

Generally, the build part positioning and the build plan are determined without consideration of how the positioning of the build part relative to the focused energy source can affect the surface and sub-surface quality of the build part, such as the surface roughness and porosity of the build part. After the additive manufacturing build process, various finishing tasks may be performed on the manufactured build part to, for example, smooth rough surfaces. Grinding rough surfaces and other finishing tasks to improve the surface quality of the part can be costly, difficult, time intensive, and/or labor intensive, thereby reducing manufacturing efficiency and increasing production costs. Additionally, for parts having inaccessible regions where typical post-processing may be ineffective or impossible, current methods may be insufficient. Furthermore, if the surface quality, sub-surface quality, or dimensional accuracy of a build part is sufficiently degraded during the additive manufacturing process, the entire built part may need to be scrapped, which is a waste of time and resources.

SUMMARY OF THE DISCLOSURE

In one or more embodiments, an additive manufacturing system is provided that includes one or more processors configured to determine one or more geometrical characteristics of each of multiple segments of a build part at a candidate position relative to an additive manufacturing instrument. The one or more geometrical characteristics include an angle of incidence between a beam line extending from a source of focused energy beams and a surface normal of a respective skin of the corresponding segment proximate to the beam line. The one or more processors are configured to control the additive manufacturing instrument, based on the one or more geometrical characteristics, to direct focused energy beams from a first orientation relative to the build part to form a first segment of the segments of the build part and to direct focused energy beams from a second orientation relative to the build part to form a second segment of the segments of the build part.

In one or more embodiments, a method (e.g., for additively manufacturing a build part) is provided. The method includes determining one or more geometrical characteristics of each of multiple segments of a build part at a candidate position relative to an additive manufacturing instrument prior to additively manufacturing the build part. The one or more geometrical characteristics include an angle of incidence between a beam line extending from a source of focused energy beams and a surface normal of a respective skin of the corresponding segment proximate to the beam line. The method also includes controlling the additive manufacturing instrument, based on the one or more geometrical characteristics, to direct focused energy beams from a first orientation relative to the build part to form a first segment of the segments of the build part, and controlling the additive manufacturing instrument, based on the one or more geometrical characteristics, to direct focused energy beams from a second orientation relative to the build part to form a second segment of the segments of the build part.

In one or more embodiments, an additive manufacturing system is provided that includes an additive manufacturing instrument and one or more processors. The additive manufacturing instrument includes a platform and one or more beam emitters configured to emit focused energy beams from multiple different source locations relative to the platform. The one or more processors are configured to determine one or more geometrical characteristics of each of multiple segments of a build part at a candidate position relative to the additive manufacturing instrument. The one or more geometrical characteristics include an angle of incidence between a beam line extending from a corresponding one of the source locations and a surface normal of a respective skin of the corresponding segment proximate to the beam line. The one or more processors are configured to control the one or more beam emitters, based on the one or more geometrical characteristics, to direct the focused energy beams from a first source location relative to the platform to form a first segment of the segments of the build part and to direct the focused energy beams from a second source location relative to the platform to form a second segment of the segments of the build part.

BRIEF DESCRIPTION OF THE DRAWINGS

These and other features, aspects, and advantages of the present disclosure will become better understood when the following detailed description is read with reference to the accompanying drawings in which like numerals represent like parts throughout the drawings, wherein.

DETAILED DESCRIPTION OF THE DISCLOSURE

Figure 1:
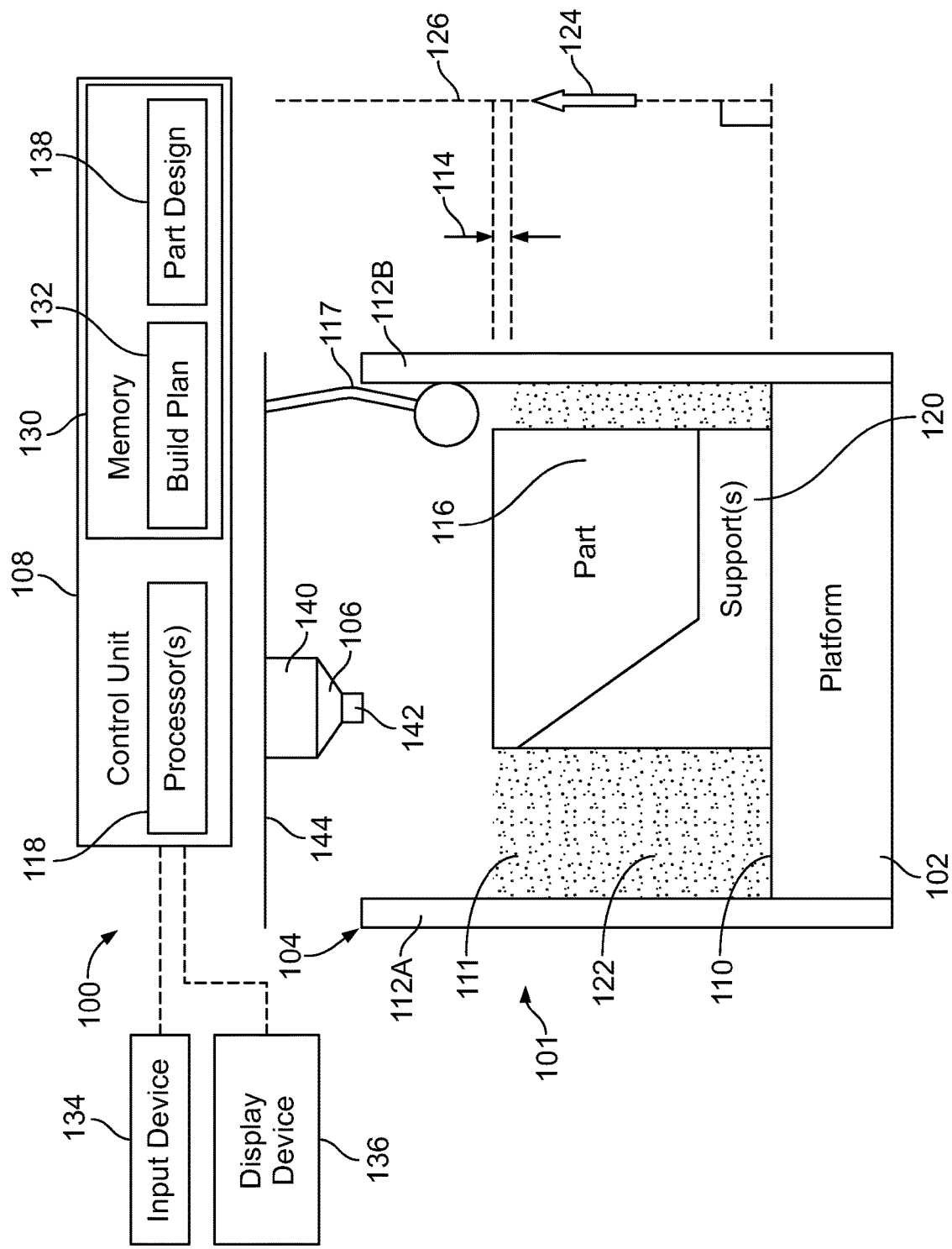
FIG. 1 is a schematic illustration of an additive manufacturing system according to a first embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

In consideration of the cost, time, and labor of performing surface treatments after the additive build process, there are several advantages in techniques for additively manufacturing build parts that have inherently improved surface quality, near-surface quality, and geometric accuracy, thereby eliminating or at least expediting post-build surface treatments. Embodiments of the present disclosure provide a system (e.g., an additive manufacturing system) and method of controlling the formation of an additively-manufactured build part using multiple beam orientations relative to the build part. The relative position of the build part geometry and the beam source may impact the stable process parameter window, and therefore the quality of the produced result.

For example, an additive manufacturing instrument is controlled to direct (e.g., emit, reflect, or the like) focused energy beams from a first source location towards a build part on a platform to form a first segment or section of the build part, and the additive manufacturing instrument is controlled to direct focused energy beams from a second source location, spaced apart from the first source location, towards the build part to form a second segment or section of the build part. In an embodiment, a first beam emitter (e.g., a laser) disposed at the first source location emits the focused energy beams to form the first segment of the build part, and a second beam emitter disposed at the second source location emits the focused energy beams to form the second segment of the build part. In another embodiment, a single beam emitter is configured to be moved between the first and second source locations, such that the same beam emitter emits focused energy beams from multiple different locations relative to the build part to form the first and second segments of the build part. In yet another embodiment, the build part is moved relative to the beam emitter(s) and other optical components instead of, or in addition to, moving the beam emitter(s). Optionally, optical components, such as mirrors, prisms, and the like, can be used to provide additional beam source locations as the optical components direct received beams towards the build part.

By changing geometric relationship between the energy beam and the geometry of the build part to be produced during the build process, the geometric accuracy and surface and near-surface qualities of the build part can be improved relative to keeping the geometric relationship between the energy beam and the build part geometry fixed throughout the build process. In one or more embodiments described herein, the additive manufacturing system determines the multiple geometric positions, such as beam source locations and/or which segments of a build part to form from each of the multiple beam source locations, based on one or more geometrical characteristics of the segments of the build part. The geometrical characteristics, as described in more detail herein, can include angle of incidence of the segment of the build part, orientation of the segment relative to an upper surface of the platform, and/or the like. The angle of incidence is the angle between a line extending from the beam emitter (e.g., a laser path) to the segment and a surface normal of a skin (e.g., side surface) of the segment of the build part just below the layer being deposited. The skin used to determine the angle of incidence is defined by edges of the layers that may have been most recently deposited. The system and method may analyze a design of the build part in a candidate position of the build part on the platform to determine the one or more geometrical characteristics of various segments or features of the build part. Known additive manufacturing systems do not emit focused energy beams from multiple different geometric positions during the build process for forming different segments of a build part based on an analysis of geometrical characteristics of the build part for the purpose of improving part accuracy and quality. Known additive manufacturing systems do not factor in the angle of incidence defined between the beam emitter and the line normal to the skin just below the top layer of the build part (e.g., the layer being deposited or most recently deposited). As stated above, improving the surface quality during the build process can increase manufacturing efficiency and reduce costs by eliminating or at least expediting post-build surface finishing treatments. Another benefit is enabling the formation of build parts that have smoother surfaces (with or without post-processing).

The build part described herein refers to a virtual object that is designed to be additively manufactured as well as a physical object produced via an additive manufacturing build process. The position or positioning of a build part within the additive manufacturing instrument refers to the location and orientation of the build part. For example, the location represents the specific area of the build platform of the additive manufacturing instrument on which the build part is constructed layer by layer. Often, multiple build parts are constructed during a common build process, so the build parts are arranged at different locations along the upper surface of the build platform. The orientation of the build part generally refers to a direction that the build part (that is to be constructed) will face and a tilt or lean of the build part. For example, the build part may be oriented about a longitudinal axis. The orientation may include a rotation of the build part about the longitudinal axis. The orientation may also include a tilt or lean of the longitudinal axis relative to a vertical axis.

The surface quality of a given surface can refer to a surface roughness, a porosity content of the wall defining the given surface, structural and/or compositional uniformity of the wall, and/or the like. Generally, higher quality surfaces of additively manufactured build parts have fewer pores, smaller pores, and are smoother (e.g., less rough) than lower quality surfaces. One or more of the embodiments described herein are configured to produce build parts that have desirable and/or satisfactory surface and sub-surface quality and dimensional accuracy to reduce the scrap rate and reduce the amount of surface finishing after the build process.

FIG. 1 is a schematic illustration of an additive manufacturing system 100 according to an embodiment. The additive manufacturing (AM) system 100 includes an additive manufacturing (AM) instrument 101, a control unit 108, an input device 134, and a display device 136. The control unit 108 can control operations of the AM instrument 101. The input device 134 and/or the display device 136 are optional components. The AM instrument 101 includes a build platform (or plate) 102, an enclosure 104, a beam emitter 106, and a source material applicator 117. The platform 102 is a planar surface of the of the AM instrument 101 and may be represented by a plate, a lower wall of the enclosure 104, or the like. The AM instrument 101 performs additive manufacturing build processes to form three-dimensional build parts 116. Each build part 116 is built up from an upper surface 110 of the platform 102 by selectively depositing a source material 111 in consecutive layers 114 and fusing the source material 111 at designated locations according to a build plan 132. Each layer 114 can be relatively thin, such as no greater than 0.5 mm, no greater than 0.25 mm, no greater than 0.1 mm, or the like.

The AM system 100 in FIG. 1 can be utilized to perform various additive manufacturing processes. Suitable additive manufacturing processes can include, for example, material extrusion (e.g., fuse deposition modeling), vat photopolymerization (e.g., stereolithography, digital light processing, continuous digital light processing, light emission diode, and/or the like), powder bed fusion (e.g., multi jet fusion, selective laser sintering, and the like), material jetting (e.g., material jetting, nanoparticle jetting, drop on demand, and the like), selective laser melting, and binder jetting. All of these processes involve depositing a layer of material on a build surface and fusing selective portions of the material using a form of energy and/or polymer binding agent that scans the surface based on a CAD pattern.

The source material 111 may be in powder form. In a non-limiting example, the powder includes one or more metals in the form of metal particles, flakes, or the like. The powder optionally can also include non-metallic filler materials intermixed with the metal material. The metal material may include various metal types, such as aluminum, stainless steel, copper, nickel, cobalt, titanium, or the like, and alloys of the various metal types. Possible non-metallic filler materials within the powder can include ceramics, polymers (e.g., plastics), silica, or the like. The powder that is deposited but is not fused to form part of the build part 116 defines a powder bed 122 of unused material 111 that is contained within walls 112A, 112B of the enclosure 104. In an embodiment, the part 116 is encased within the powder bed 122 during the build process. In an alternative embodiment, the source material 111 is free of metals.

The build part 116 is gradually formed or constructed by aggregating surface layers 114 in a build direction 124 along a build axis 126. With each successive addition of material 111 to the top of the part 116, the part 116 grows in the build direction 124. The build direction 124 extends away from the platform 102. In the illustrated embodiment, build axis 126 is orthogonal to a plane of the upper surface 110 of the platform 102.

The AM system 100 generates new layers of the part 116 by spreading a thin layer or stratum of the powder material 111 over the top of the part 116. For example, the source material applicator 117 of the AM system 100 deposits each layer 114 of material 111. The source material applicator 117 includes or represents a spreader or re-coater device that evenly spreads a thin layer of the material 111, an injector that injects the material 111, or the like. The material 111 can be stored in a reservoir prior to use. The source material application 117 is controlled by the control unit 108.

Then, the beam emitter 106 is controlled by the control unit 108 to emit focused energy beams towards the source material 111 in the top surface layer 114. The high energy beams transfer energy to designated portions of the material 111 which the beams impinge, causing the designated portions to fuse to (e.g., melt and adhere to) the consolidated mass of the build part 116. The result is that a new surface layer or fraction of the part 116 is formed. The focused energy beams are electromagnetic energy. For example the beam emitter 106 can be a laser device that generates high energy laser beams. The beam emitter 106 can be suspended above the top of the powder bed 122, such as, for example, about 0.5 meters (m) above the upper surface 110 of the platform 102. The focused energy beams emitted from the beam emitter 106 is aimed and/or directed to different locations of the power bed 122 to fuse different selected portions of the top surface layer 114 to the part 116. The beam emitter 106 may include a scanning head 142 that enables directing the beams to different locations within a designated coverage area without moving (e.g., displacing) the location of the beam emitter 106 relative to other components of the AM instrument 101. The orientation of the scanning head and parameters of the energy beams (e.g., timing, energy intensity, beam width, etc.) may be controlled by the control unit 108 via control signals. The process consecutively repeats according to instructions within the build plan 132 until the build part 116 is fully formed.

The AM instrument 101 is configured to enable focused energy beams to be emitted towards the build part 116 from multiple different source locations relative to the part 116 on the platform 102. In FIG. 1, only one beam emitter 106 is shown and the beam emitter 106 is movable (e.g., translatable) relative to the part 116 and the platform 102 to change the beam source location. The beam emitter 106 may be mechanically connected to an actuator 140 and mounted to a rail or gantry 144 that defines a track. The actuator 140 may be controlled by the control unit 108 to selectively position the beam emitter 106 at different locations along a length of the track. For example, the actuator 140 can move the beam emitter 106 along the rail or gantry 144 towards a first wall 112A of the enclosure 104 and/or towards a second wall 112B of the enclosure 104. The movement of the beam emitter 106 along the rail or gantry 144 is independent from the operation of the scanning head 142 of the beam emitter 106. In an embodiment, the AM instrument 101 has only one beam emitter 106, and the movement of the beam emitter 106 enables forming different segments of the part 116 from different beam source locations. In an alternative embodiment, the AM instrument 101 includes one or more reflective surfaces that function as relay components. The one or more reflective surfaces may be spaced apart from the beam emitter 106 to redirect focused energy beams that impinge thereon towards the platform 102 to effectively change the source location of the energy beams relative to the build part 116.

In one or more alternative embodiments, the AM instrument 101 has multiple beam emitters 106. In a first alternative embodiment, each of the multiple beam emitters 106 is secured in different fixed positions (e.g., not translatable), and the control unit 108 selectively controls the beam emitters 106 to provide the focused energy beams from the different source locations. For example, in the first alternative embodiment, the AM instrument 101 may lack the actuator 140 and the rail or gantry 144. In a second alternative embodiment, at least one of the multiple beam emitters 106 is translatable relative to the other components of the AM instrument 101, similar to the beam emitter 106 shown in FIG. 1. For example, the AM instrument 101 may include at least one translatable beam emitter 106 and at least one beam emitter 106 that is not translatable or may include multiple translatable beam emitters 106 without any non-translatable beam emitters 106.

The AM instrument 101 may be controlled to form one or more external supports 120 during the build process for structurally supporting overhanging features of the build part 116. The one or more external supports 120 are additively formed during the same build process that forms the build part 116. For example, the build part 116 and the external supports 120 are both composed of a series of stacked material layers that are fused together during an additive manufacturing build process. Optionally, the internal structure (e.g., density, lattice, etc.) and/or material composition of the external supports 120 may be different than the build part 116. For example, the structure of the external support 120 may be less dense than the structure of the build part 116.

The control unit 108 represents hardware circuitry that includes and/or is connected with one or more processors 118 (e.g., one or more microprocessors, integrated circuits, microcontrollers, field programmable gate arrays, etc.) that perform operations described in connection with the control unit 108. The one or more processors 118 may operate based on programmed instructions. The one or more processors 118, which may include a single processor or multiple processors, are referred to herein in the plural form "processors" without limiting the scope to requiring multiple processors 118. The control unit 108 also includes a tangible and non-transitory computer-readable storage medium (e.g., memory) 130. The memory 130 may store the programmed instructions (i.e., software) that dictate the operations of the processors 118. For example, the memory 130 stores the build plan 132 associated with the build part 116 that is being fabricated.

The memory 130 may also store a part design file 138 of the build part 116. The part design file 138 may be a computer-aided design (CAD) file or another data file that describes the physical characteristics of the part 116, such as the shape, size, and/or composition of the part 116. The build plan 132 may be generated based on the design file 138. The build plan 132 may be a data file that dictates parameters, conditions, settings, and/or operations of the AM instrument 101 in order to produce a physical build part 116 which is a replica or match of the virtual part characterized in the design file 138. One or more parameters or settings dictated by the build plan 132 may include a positioning of the build part 116 on the platform 102, a sequence of actions taken by the AM instrument 101 to build the part 116, the locations of supports 120, and the like. The sequence of actions to be taken by the AM instrument 101, as designated in the build plan 132, can include when and where for the actuator 140 to move the beam emitter 106 (if the beam emitter is translatable) and/or the platform 102 (if the platform is translatable), a designated scan path along which the scanning head 142 of each emitter 106 is to direct focused energy beams from each corresponding beam source location, parameters of the focused energy beams (e.g., timing, energy intensity, beam width, etc.), and the like. Additional parameters specified in the build plan 132 may include settings such as offsets, layer thicknesses, gas flow parameters, and the like. The control unit 108 (e.g., the processors 118 thereof) controls the operations of the one or more beam emitters 106, the source material applicator 117, and/or other components based on the build plan 132 to produce the build part 116, according to a proposed design, in a selected position on the platform 102.

The processors 118 of the control unit 108 may be communicatively connected to the input device 134 and the display device 136. The input device 134 may include a touchpad, a touchscreen, a keyboard, a mouse, physical buttons, a joystick, or the like. The input device 134 enables an operator to provide commands to the AM system 100. In a non-limiting example, the operator can use the input device 134 to select the design file 138, to select a candidate position of the build part 116 on the platform 102, to initiate the build process, and/or to select or adjust additional settings and parameters of the AM instrument 101. The display device 136 includes a display screen that is configured to display a graphical user interface. Optionally, the input and display devices 134, 136 may be integrated together within a unitary device, such as a laptop computer, a desktop computer, a workstation, a tablet computer, a mobile, handheld computing device (e.g., smartphone), or the like. The processors 118 may be operably connected to the input device 134 and/or the display device 136 via a wired or wireless communication pathway.

In one embodiment, the processors 118 of the control unit 108 are configured to generate the build plan 132. For example, the processors 118 may access the part design file 138 that is stored in the memory 130. The design file 138 can be received from a remote computing device or generated locally via operator inputs on the input device 134. The processors 118 may receive user inputs selecting a candidate position of the build part 116 on the platform 102. The processors 118 may generate the build plan 132 based on the design of the part 116 and the selected position of the part 116. In an alternative embodiment, the processors 118 do not generate the build plan 132, but rather implement control instructions that are generated remote from the AM instrument 101. For example, machine instruction may be processed externally by a computer or processing unit and transferred to the AM instrument 101 to be performed by the AM instrument 101.

Figure 2:
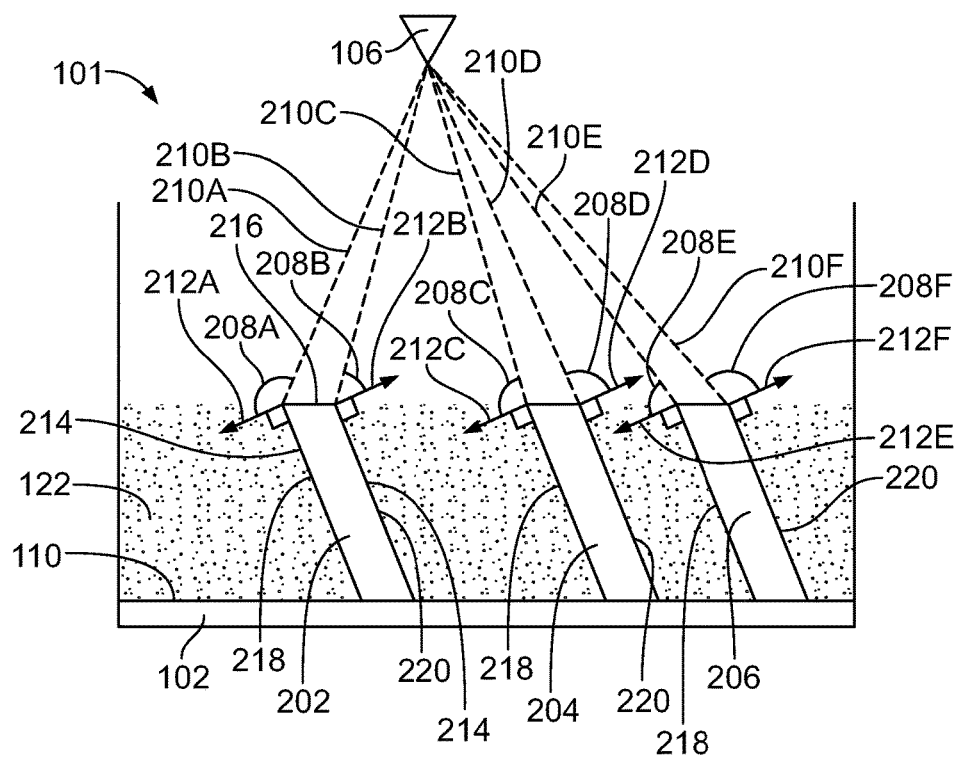
FIG. 2 illustrates a schematic diagram of an additive manufacturing instrument within the additive manufacturing system according to an embodiment.

FIG. 2 illustrates a schematic diagram of the AM instrument 101 according to an embodiment. FIG. 2 shows a first coupon 202, a second coupon 204, and a third coupon 206 being additively manufactured on the upper surface 110 of the platform 102. The coupons 202, 204, 206 are discrete and spaced apart from one another, but may be representative of different segments of a single build part, such as the part 116 shown in FIG. 1, that will subsequently conjoin during the build process. In the illustrated embodiment, the coupons 202, 204, 206 have the same size, shape, and orientation relative to the platform 102. Furthermore, the coupons 202, 204, 206 are formed using the same materials and the same parameters of the beam emitter 106. The coupons 202, 204, 206 are encased within the powder bed 122. The only differences between the coupons 202, 204, 206 are in the positioning of the coupons 202, 204, 206 relative to the AM instrument 101 (e.g., the beam emitter 106 and the platform 102).

The positioning of the coupons 202, 204, 206 can refer to the location and orientation of the coupons 202, 204, 206 relative to the beam emitter 106. More specifically, the positioning can refer to the location and orientation of each of multiple different segments or layers of the coupons 202, 204, 206 relative to the beam emitter 106. The positioning can be characterized by the angle of incidence of individual segments of the coupons 202, 204, 206 relative to the beam emitter 106.

The angle of incidence 208 is the angle between a beam line 210 and a line 212 representing a surface normal vector of a skin. The beam line 210 represents the path of a laser beam or other focused energy beam that is emitted or would be emitted from the beam emitter 106 to a surface layer 216 (e.g., top layer) of the respective coupon segment to generate the surface layer 216. The surface layer 216 is the most-recently formed layer at a given time that is at the top (e.g., end) of the layer stack. The skin 214 may represent the side surface (e.g., edge) of one or more layers of the respective coupon immediately below the surface layer 216 and proximate to the beam line 210. If the skin 214 is curved (e.g., non-planar), the line 212 can be normal to a tangent of the curved skin 214 at a location just below the surface layer 216. The build parts are three-dimensional, so the lines 212 of different skin segments of the same or different parts can have different vertical, lateral, and/or longitudinal or depth components relative to the beam emitter 106. The angle of incidence 208 as described herein is based on the positioning (e.g., location and orientation) of a given segment of a build part relative to the emitter 106. For example, the surface normal 212 is affected by the orientation of the skin 214, and the beam line 210 is affected by the location of the segment (e.g., the skin 214) relative to the emitter 106.

The three coupons 202, 204, 206 in FIG. 2 have the same sizes and shapes and the same orientations relative to the platform 102. The first, second, and third coupons 202, 204, 206 are overhanging objects in the illustrated embodiment. The coupons 202, 204, 206 each include a respective downskin 218 that faces generally towards the platform 102 and an upskin 220 that is opposite the downskin 218. The upskins 220 generally face upward away from the platform 102. The downskin 218 and upskin 220 of each coupon 202, 204, 206 represent angled skins 214, so the normal lines 212 are perpendicular to the areas or portions of the downskin 218 and upskin 220 proximate to the surface layer 216.

The three coupons 202, 204, 206 have different positions relative to the beam emitter 106, which are indicated by different angles of incidence 208. For example, the first coupon 202 defines a first angle of incidence 208A between the line 212A normal to the respective downskin 218 and a first beam line 210A. The first coupon 202 defines a second angle of incidence 208B between the line 212B normal to the respective upskin 220 and a second beam line 210B. The second coupon 204 defines a third angle of incidence 208C between the line 212C normal to the respective downskin 218 and a third beam line 210C. The second coupon 204 defines a fourth angle of incidence 208D between the line 212D normal to the respective upskin 220 and a fourth beam line 210D. The third coupon 206 defines a fifth angle of incidence 208E between the line 212E normal to the respective downskin 218 and a fifth beam line 210E. The third coupon 206 defines a sixth angle of incidence 208F between the line 212F normal to the respective upskin 220 and a sixth beam line 210F. In the illustrated embodiment, the first, third, and sixth angles of incidence 208A, 208C, 208F are obtuse (e.g., greater than 90 degrees). The skins 214 associated with obtuse angles of incidence are referred to herein as outskins for reasons provided below. The second and fifth angles of incidence 208B, 208E are acute (e.g., less than 90 degrees). The skins 214 associated with acute angles of incidence are referred to herein as inskins. The fourth angle of incidence 208D is a right angle (e.g., 90 degrees). Skins 214 associated with right angles of incidence represent an inflection or tipping zone between outskins and inskins.

The orientations of the skins 214 of the coupons 202, 204, 206 relative to the platform 102 represents another geometrical characteristic that optionally can be used to determine the one or more source locations of the focused energy beams during the build process. The orientation of each skin 214 relative to the platform 102 can refer to a tilt angle defined between the skin 214 (or a tangent line extending from a curved skin 214) and the upper surface 110 of the platform 102 on which the coupons 202, 204, 206 are constructed. The downskins 218 of the first, second, and third coupons 202, 204, 206 all have the same orientations relative to the platform 102 in FIG. 2, and the upskins 220 of the coupons 202, 204, 206 also have the same orientations relative to the platform 102.

Experimental testing has demonstrated that the angle of incidence 208 between the beam line 210 and the line 212 normal to the skin 214 can significantly impact the formation of the build part, such as the surface quality, near-surface quality, porosity, and dimensional accuracy. For example, in an experimental setup similar to that shown in FIG. 2, it was determined that outskins, in which the angle of incidence 208 is greater than 90 degrees, have significantly worse properties (e.g., surface and near-surface quality, porosity, and dimensional accuracy) than inskins, in which the angle of incidence 208 is less than 90 degrees, even though all test parameters were the same. The outskins shown in FIG. 2 include the downskin 218 of the first coupon 202, the downskin 218 of the second coupon 204, and the upskin 220 of the third coupon 206. The inskins shown in FIG. 2 include the upskin 220 of the first coupon 202 and the downskin 218 of the third coupon 206. These results indicate that some downskin surfaces 218 can be inskins (e.g., the downskin 218 of the third coupon 206) and other downskin surfaces 218 can be outskins (e.g., the downskins 218 of the first and second coupons 202, 204), which have degraded properties relative to the inskins. Similarly, some upskin surfaces 220 can be inskins (e.g., the upskin 220 of the first coupon 202) and other upskin surfaces 220 can be outskins (e.g., the upskin 220 of the third coupon 206).

A potential explanation for this phenomenon is different local absorption of the focused beam energy due to different incident angles of the laser beam relative to the proximal part geometry, as suggested in S. Kleszczynski, A. Ladewig, K. Friedberger, J. zur Jacobsmühlen, D. Merhof, and G. Witt (2015). Position Dependency of Surface Roughness in Parts from Laser Beam Melting Systems. 26th International Solid Free Form Fabrication (SFF) Symposium, USA, pp 360-370, which is incorporated by reference herein in its entirety. For example, when forming a surface layer 216 along or proximate to an outskin surface (e.g., which defines an angle of incidence 208 greater than 90 degrees), some of the energy of the focused beam may be absorbed into the underlying powder within the powder bed 122, which affects the melt pool.

Figure 3:
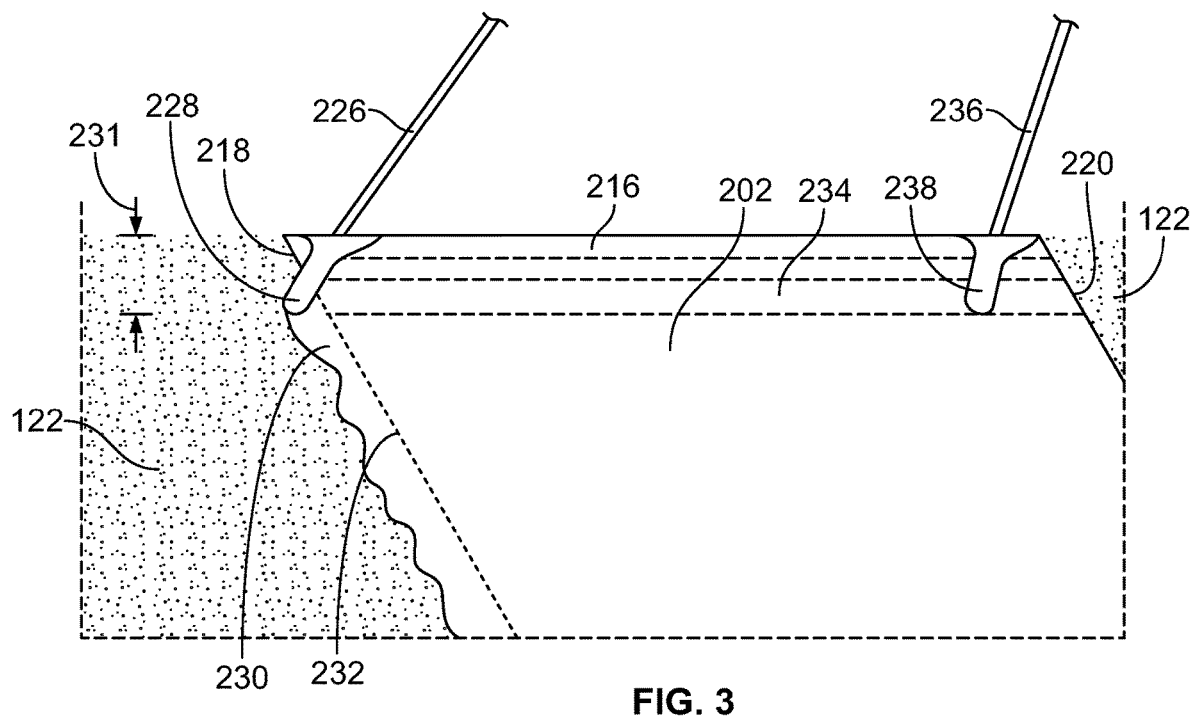
FIG. 3 illustrates a close-up portion of a first coupon shown in FIG. 2.

FIG. 3 illustrates a close-up portion of the first coupon 202 shown in FIG. 2. A laser beam 226 impinges upon the surface layer 216 proximate to the downskin 218 of the coupon 202. Because the angle of incidence 208A between the laser beam 226 and the line 212A normal to the downskin 218 is greater than 90 degrees, as shown in FIG. 2, the downskin 218 is classified as an outskin. The high energy laser beam 226 melts the source material, causing a melt pool 228. The shape of the melt pool 228 may not accurately accommodate for the part dimension, at least along areas proximate to the outskin. For example, the melt pool 228 in FIG. 3 penetrates a depth 231 that extends beyond the desired downskin edge 232 of the coupon 202, such that the energy of the beam 226 blows out into the powder bed 122. The energy absorbed by the powder can cause additional, undesired material, referred to herein as melt extensions 230, to form along the downskin surface 218 as the material cools and solidifies. The melt extensions 230 can increase surface roughness (e.g., reduce surface quality), increase porosity, and dimensional inaccuracy. The dimensional inaccuracy refers to the increased thickness or lateral width of the downskin 218 relative to the thickness/lateral width defined by the desired downskin edge 232. It is noted that the top-most layer or layers, including the surface layer 216, may be dimensionally accurate, at least at the current time during the build process. The laser penetration causes the previously-formed layers below the top-most layer(s) to be grown. In FIG. 3, for example, the melt pool 228 causes melt extensions 230 to grow along the layer 234 that is two layers below the surface layer 216. The melt extensions 230 aggregate during the additive build process as additional layers of material are formed.

With continued reference to FIG. 2, the angle of incidence 208B at the upskin 220 of the first coupon 202 is quite different from the angle of incidence 208A at the downskin 218 of the first coupon 202. The angle of incidence 208B is acute, indicating that the upskin 220 of the first coupon 202 represents an inskin. Inskins are associated with improved quality characteristics, such as surface quality, near-surface quality, porosity, and dimensional accuracy, relative to outskins. The variation in quality may be attributable to the geometry of the build part underlying the newly-deposited surface layer 216. For example, energy from a laser beam 236 that is directed along the beam line 210B shown in FIG. 2 may be absorbed by the partially solidified or consolidated underlying material of the first coupon 202, resulting in less energy directed beyond the upskin 220 boundary and into the powder bed 122 (compared to the downskin 218). The melt pool 238 formed by the laser beam 236 may not penetrate through the upskin 220 boundary due to the angle of the beam 236 relative to the geometry of the coupon 202. For example, the melt pool 238 extends at least partially inward towards a lateral center of the coupon 202. Essentially, there is more of the partially solidified underlying material of the coupon 202 present to absorb the energy of the beam 236 than is present to absorb the energy of the beam 226. As a result, there is less heating of the powder bed 122 along the upskin 220 than the amount of heating of the powder bed 122 along the downskin 218, so fewer melt extensions and other non-uniformities form along the upskin surface 220, improving the surface quality and near-surface quality, the dimensional accuracy, and the porosity relative to the downskin 218.

As shown in FIG. 2, the angle of incidence 208D at the upskin 220 of the second coupon 204 is a right angle, which indicates that the beam line 210D is collinear with the angle of the upskin 220 just below the layer of material being deposited or most recently deposited. The upskin 220 of the second coupon 204 represents a tipping point or inflection zone between the inskins and the outskins. For example, the inflection zone can represent a range of angles that is between the inskins and outskins. The system disclosed herein may treat inflection zone skins differently than the inskins and outskins. The inflection zone can be a range centered at an inflection point, such as, but not limited to, 90 degrees. For example, the inflection zone can be between 70 degrees and 110 degrees, 80 degrees and 100 degrees, or the like.

Figure 4:
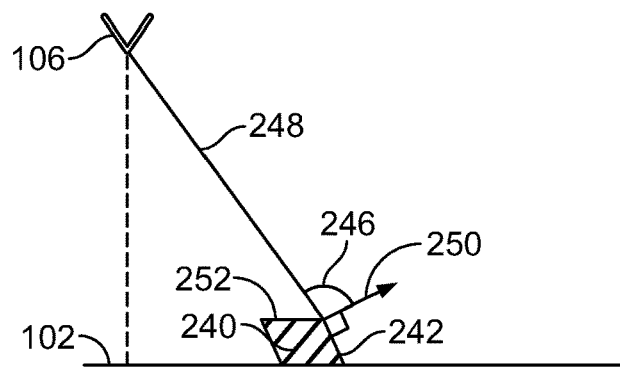
FIG. 4 illustrates a schematic diagram of the additive manufacturing instrument during a first stage in the construction of a single coupon according to an embodiment of the present disclosure.
Figure 5:
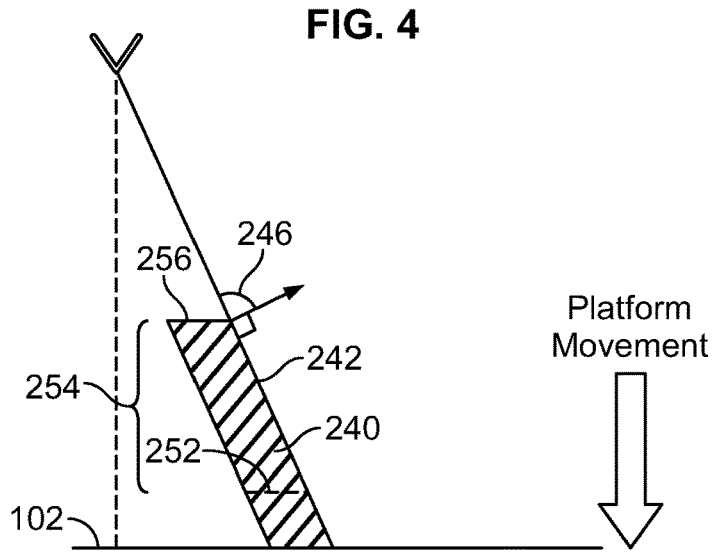
FIG. 5 illustrates a schematic diagram of the additive manufacturing instrument during a second stage in the construction of the coupon shown in FIG. 4.
Figure 6:
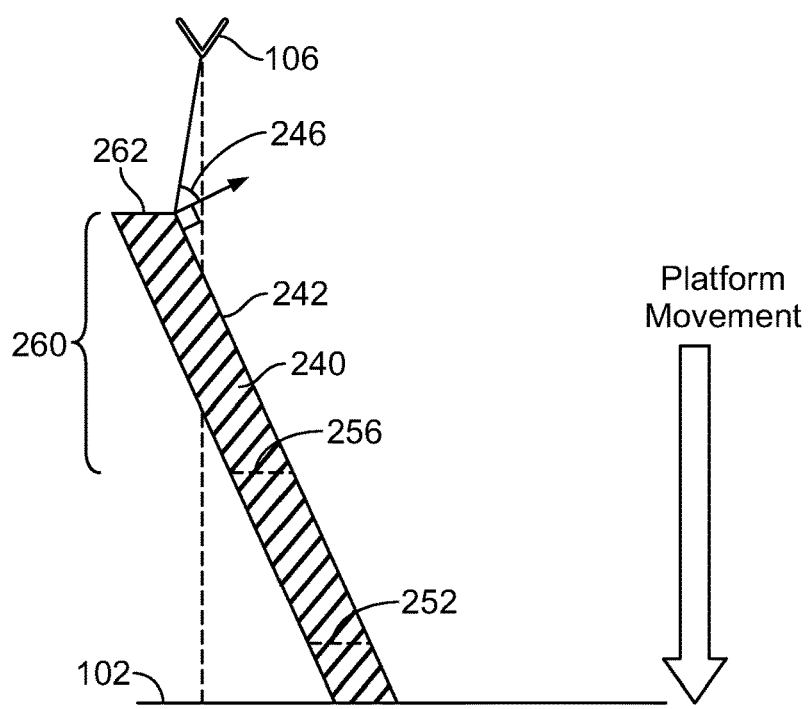
FIG. 6 illustrates a schematic diagram of the additive manufacturing instrument during a third stage in the construction of the coupon shown in FIGS. 4 and 5.

During the additive manufacturing process in which layers of material are consecutively deposited in a stack according to a designated build part geometry, the angle of incidence of a given skin of the build part relative to the beam emitter can change over time. For example, FIGS. 4-6 illustrate three different stages in the construction of a single coupon 240 over time by the AM instrument 101 according to an embodiment. The stages are chronological, such that the stage shown in FIG. 4 is prior to the stages shown in FIGS. 5 and 6, and the stage shown in FIG. 5 is before the stage shown in FIG. 6. FIGS. 4-6 show the effects of a part being built with a platform 102 that gradually drops (e.g., moves away from the beam emitter 106) as additional layers of material are deposited. The beam emitter 106 is disposed in the same position at each of the three illustrated stages of the build process, such that the beam emitter 106 is not moved. The coupon 240 that represents the build part in FIGS. 4-6 has a rhomboid shape with parallel, linear upskin 242 and downskin 244 surfaces.

The angle of incidence 246 based on the part geometry at the upskin 242 relative to the beam emitter 106 changes over time. As described above, the relevant angle of incidence 246 is defined between a beam line 248 from the beam emitter 106 and the line 250 normal to the portion of the upskin 242 proximate to the current surface layer 252 of the coupon 240. In FIG. 4, the angle of incidence 246 is an obtuse angle (e.g., greater than 90 degrees), which indicates that the upskin 242 has an outskin classification. The segment of the coupon 240 formed at or proximate to the upskin 242 may have a degraded quality and/or accuracy that requires additional finishing steps post-build to increase the smoothness and/or provide proper dimensional alignment.

FIG. 5 shows that the platform 102 has moved and an additional portion 254 of the coupon 240 has been formed subsequent to the stage shown in FIG. 4. The additional portion 254 extends from the previous surface layer 252 to a current surface layer 256. In the illustrated stage, the angle of incidence 246 based on the upskin 242 is a right angle, which indicates that the upskin 242 is at the tipping or inflection point between the outskin and inskin classifications. The segment of the coupon 240 formed at or proximate to the upskin 242 at the surface layer 256 is expected to have better quality and/or accuracy than the upskin 242 at the previous surface layer 252 due to the difference in angle of incidence 246.

FIG. 6 shows that the platform 102 has moved farther away from the fixed beam emitter 106 than shown in FIG. 5, and an additional portion 260 of the coupon 240 has been formed subsequent to the stage shown in FIG. 5. The additional portion 260 extends from the previous surface layer 256 to a current surface layer 262. In the illustrated stage, the angle of incidence 246 based on the upskin 242 is an acute angle (e.g., less than 90 degrees), which indicates that the upskin 242 has an inskin classification. The segment of the coupon 240 formed at or proximate to the upskin 242 at the surface layer 262 is expected to have better quality and/or accuracy than the upskin 242 at the previous surface layers 256, 252 due to the angle of incidence 246 differences. FIGS. 4-6 show that, as the rhomboid coupon 240 grows taller and the positioning of the surface layer changes relative to the beam emitter 106, the upskin 242 can transition from representing an outskin to an inskin, and vice-versa. Therefore, multiple layers of the build part geometry and design are evaluated to determine the angle of incidence effects on the build part. Optionally, every layer of the build part geometry along skin surfaces is evaluated for classification as either an outskin, an inskin, or an inflection point.

Figure 7:
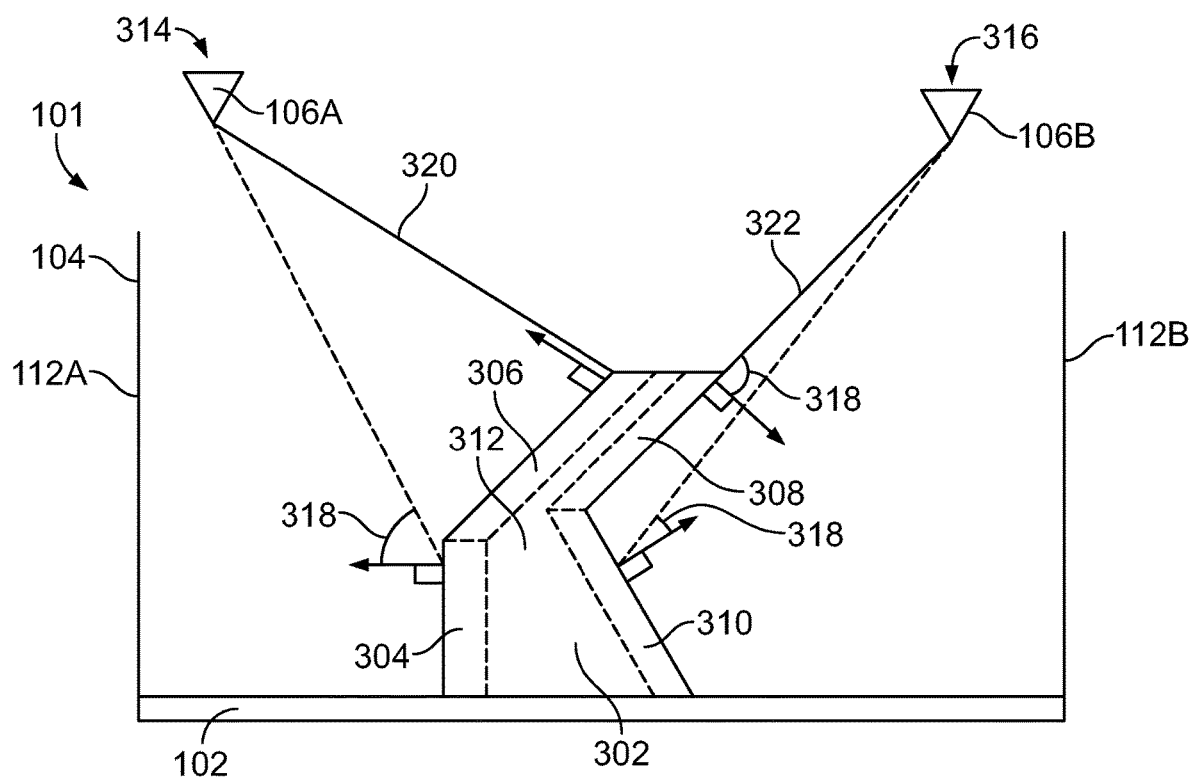
FIG. 7 illustrates a schematic diagram of the additive manufacturing instrument according to another embodiment of the present disclosure.

FIG. 7 illustrates a schematic diagram of the additive manufacturing (AM) instrument 101 according to a second embodiment of the present disclosure. The AM instrument 101 is in the process of additively manufacturing a build part 302 on the platform 102. The build part 302 has a non-symmetric shape in the illustrated embodiment. The build part 302 is being formed according to the system and method described herein that accounts for the geometry of the build part relative to a beam source to determine multiple relative positions of the build part 302 to one or more beam emitters during the build process.

In the illustrated embodiment, the AM instrument 101 includes a first beam emitter 106A and a second beam emitter 106B. The beam emitters 106A, 106B are spaced apart from each other. The first beam emitter 106A is disposed at a first source location 314, and the second beam emitter 106B is disposed at a second source location 316. For example, the beam emitters 106A, 106B are located proximate to the respective first and second walls 112A, 112B of the enclosure 104. The beam emitters 106A, 106B may be disposed at or near opposite sides or corners of the three-dimensional AM instrument 101. For example, the first beam emitter 106A may be located at or proximate to one corner of the enclosure 104, and the second beam emitter 106B is located at or proximate to an opposite corner of the enclosure 104. In an embodiment, the coverage areas of the beam emitters 106A, 106B overlap. The coverage area of a beam emitter refers to a region within which a respective scanning head of the beam emitter can direct focused energy beams to any location. The coverage area is based on the positioning of the beam emitter and the capabilities of the scanning head and other beam control elements. Optionally, the coverage area of the first beam emitter 106A may substantially overlap the coverage area of the second beam emitter 106B, such that the overlapping portion represents at least a majority of each of the coverage areas. In the illustrated embodiment, the first and second beam emitters 106A, 106B are non-translatable relative to the platform 102, such that the beam emitters 106A, 106B are fixedly secured in place at the respective source locations 314, 316. Alternatively, at least one of the beam emitters 106A, 106B is controllably translatable relative to the platform 102. Optionally, the platform 102 may be translatable. For example, the platform 102 may be controlled to move away from the beam emitters 106A, 106B, similar to the moving platform 102 described in FIGS. 4-6.

In one or more embodiments, the processors 118 of the control unit 108 (shown in FIG. 1) are configured to analyze the geometry (e.g., geometric design) of the build part 302 and selected position of the build part 302 on the platform 102 to determine geometrical characteristics of various segments of the build part 302. The geometry and/or the position can be provided in the design file 138 accessed by the processors 118. Optionally, the position can be selected by an operator using the user input device 134. Although FIG. 7 shows the build part 302 at least partially formed on the platform 102, the analysis process described herein may be performed by the processors 118 prior to commencing the additive manufacturing build process.

The processors 118 are configured to determine one or more geometrical characteristics of each of multiple segments or portions of the build part 302, based on the geometry and selected position of the build part 302 relative to the AM instrument 101, to determine which source location 314, 316 to use for forming the designated segment during the build process. The goal of the analysis is to select the beam source location that is expected to provide improved (or at least satisfactory) quality and accuracy of the resulting segment of the build part. The one or more geometrical characteristics include the angle of incidence between the beam source location that emits the focused energy beams and the line normal to the skin just below (within a designated number of layers from) the surface layer of the segment. The system described herein is configured to select the beam source locations based on the angle of incidence, which is expected to provide improved quality and accuracy relative to using only a single beam source location or using multiple beam source locations without consideration of the angle of incidence.

The build part may be partitioned into different constituent segments by the one or more processors 118 based on the geometry of the build part 302. In the illustrated embodiment, the build part 302 is partitioned into multiple contour segments 304, 306, 308, 310 and an infill segment 312, segmented by dashed lines in FIG. 7. The first segment 304 includes a vertically-oriented skin. The second segment 306 is formed on top of the first segment 304 and includes an upskin. The third segment 308 defines a downskin across from the second segment 306. The fourth segment 310 defines an upskin below the third segment 308, such that the third segment 308 is formed on top of the fourth segment 310. The infill segment 312 is laterally disposed between the first and fourth segments 304, 310 and between the second and third segments 306, 308. The infill segment 312 may be filled with bulk material that has different properties than the material deposited to form the contour segments 304, 306, 308, 310. Optionally, the mechanical structure of the infill segment 312, such as a lattice structure, may differ from the mechanical structure of the contour segments 304, 306, 308, 310 regardless of whether or not the material properties of the infill and contour segments are the same. It is noted that the contour segments 304, 306, 308, 310 define different external surfaces of the build part 302. Although the external surfaces are linear in FIG. 7, the build part 302 can have curved skins/surfaces.

In an embodiment, the processors 118 may analyze the angle of incidence that is defined between each segment of the build part and each potential beam source location to select which beam source location to utilize for emitting focused energy beams towards the segment to form one or more layers on the segment. For example, the processors 118 may calculate an angle of incidence between the first beam source location 314 and the first segment 304 and an angle of incidence between the second beam source location 316 and the first segment 304. The processors 118 may select which beam source location 314, 316 to use for forming the first segment 304 based at least in part on a comparison on the angles of incidence. In an embodiment, because inskins have been determined to provide desirable surface and near-surface quality, porosity, and dimensional accuracy, the processors 118 may select the beam source location that is associated with an angle of incidence less than 90 degrees as the location to use during the build process. In an embodiment, if both the angles of incidence based on the first and second source locations 314, 316 are less than 90 degrees, such that both skin surfaces would classify as inskins, the processors 118 may select the beam source location that has the smallest angle of incidence. The smaller angle of incidence may cause less energy to be directed away from the surface layer into the surrounding powder bed, thereby improving surface quality relative to emitting laser beams from the other beam source location.

The processors 118 may be configured to consider secondary factors besides angle of incidence to determine the beam source location to utilize for forming a corresponding segment (e.g., without selecting the source location based on angle of incidence alone). Secondary factors can include respective efficiencies of the different beam emitters 106A, 106B, respective workloads and/or capabilities of the beam emitters 106A, 106B, the presence of any intervening gas clouds or other potential interference, and/or the like. The secondary factors can be used to as tie-breakers, for example, when selecting between multiple source locations that have similar angles of incidence. For example, if the angle of incidence associated with the first beam emitter 106A is 60 degrees and the angle of incidence associated with the second beam emitter 106B is 45 degrees, the first beam emitter 106A may be selected for forming the given segment if the secondary factors favor the first beam emitter 106A, even though the angle of incidence is greater than that of the second beam emitter 106B.

In the illustrated embodiment, as a result of the analysis, the processors 118 may select the first beam emitter 106A at the first source location 314 for forming the first segment 304 of the build part 302. For example, the angle of incidence 318 based on the first source location 314 is acute, so the vertically-oriented skin of the first segment represents an inskin. Although not shown, the angle of incidence based on the second source location 316 would be obtuse, indicating that the skin of the first segment would represent an outskin. Therefore, the first beam emitter 106A is selected to emit focused energy beams towards the first segment 304, which is expected to improve the surface and near-surface quality, porosity, dimensional accuracy, and/or the like, relative to forming the first segment 304 by emitting energy beams from the second beam emitter 106B. Based on the angle of incidence analysis, the processors 118 may select the first beam emitter 106A to form the second segment 306 of the build part 302, and the second beam emitter 106B at the second source location 316 to form both the third and fourth segments 308, 310 of the build part 302. Optionally, the beam source location used to form the infill segment 312 may be based on considerations other than angle of incidence, such as the secondary factors described above. In an embodiment, either or both of the beam emitters 106A, 106B can be used to form the infill segment 312 based on availability of the emitters 106A, 106B and other factors at different stages of the build process.

Although only one normal line is shown extending from each of the contour segments 304, 306, 308, 310 in FIG. 7, it is recognized that the angle of incidence may change layer by layer, even along a linear segment, as shown in FIGS. 4-6. In an embodiment, the processors 118 may evaluate the geometry of the build part 302 layer by layer when determining how to partition the build part 302 into different segments and how to assign the segments to different beam source locations (e.g., locations 314 and 316).

After designating which beam source location 314, 316 is to be utilized to form each of the various segments 304, 306, 308, 310, 312 of the build part 302, the processors 118 may control the AM instrument 101 to additively manufacture the build part 302. For example, the processors 118 may generate, or at least update, the build plan 132 to incorporate the associated beam source locations and part segments. The build plan 132 designates operations to be performed by the AM instrument 101 to form the build part 302. The build plan 132 may provide a first set of scan paths for the first beam emitter 106A and a second set of scan paths for the second beam emitter 106B. The first set of scan paths outline paths for the scanning head of the first emitter 106A to aim focused energy beams (e.g., beam 320) towards the segment 306. The second set of scan paths outline paths for the scanning head of the second emitter 106B to aim focused energy beams (e.g., beam 322) towards the segment 308). The processors 118 may control the components of the AM instrument 101 according to the build plan 132 to produce the build part 302. The processors 118 may generate control signals that are communicated to the different components (e.g., the beam emitters 106A, 106B, the applicator device 117, and the like) to control the AM instrument 101.

Although two beam emitters 106A, 106B are shown in FIG. 7, the AM instrument 101 optionally may include three or more emitters disposed at different designated locations of the AM instrument 101. For example, the instrument 101 may have three emitters 106 arranged at the same height from the platform 102 to form an equilateral triangle. In another example, the instrument 101 may have four emitters 106 arranged at each of four corners or along each of four sides of the enclosure 104. The analysis described above may be performed to determine which of the three or more emitters 106 is best positioned to emit beams for forming each of various segments of the build part(s).

Figure 8:
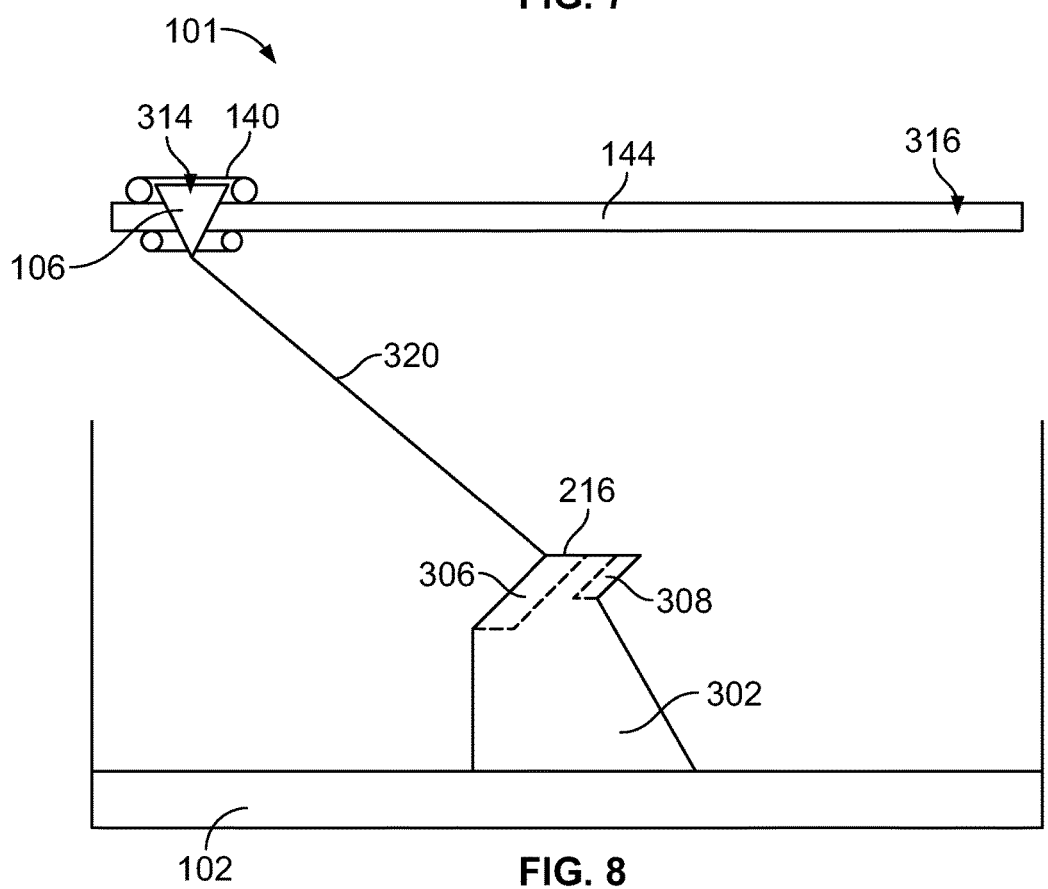
FIG. 8 illustrates a schematic diagram of the additive manufacturing instrument according to the embodiment shown in FIG. 1.

FIG. 8 illustrates a schematic diagram of the additive manufacturing (AM) instrument 101 according to the first embodiment of the present disclosure shown in FIG. 1. In FIG. 8, the AM instrument 101 includes a beam emitter 106 that is translatable relative to other components of the AM instrument 101, such as the platform 102. The beam emitter 106 is mounted on the rail or gantry 144, as shown in FIG. 1, and is moved by the actuator 140. The actuator 140 may be a motorized device that is controlled by the processors 118 of the control unit 108 (shown in FIG. 1). The actuator 140 may roll or slide the beam emitter 106 along a track defined by the rail or gantry 144. The actuator 140 can selectively position the beam emitter 106 at the first source location 314 and the second source location 316.

In the illustrated embodiment, the beam emitter 106 can be used to form multiple different segments of the build part 302 shown in FIG. 7. For example, the processors 118 may control the actuator 140 to position the beam emitter 106 at the first source location 314 to emit focused energy beams 320 toward the surface layer 216 of the second segment 306 to form the segment 306. Then, the processors 118 can control the actuator 140 to move the beam emitter 106 along the rail or gantry 144 to the second source location 316 to emit focused energy beams toward the third segment 308. The actuator 140 may be controlled to move the beam emitter 106 back and forth between the two source locations 314, 316 during the course of the build process. Optionally, the beam emitter 106 may be the only beam emitter 106 of the AM instrument 101. In an embodiment, the track along the rail or gantry 144 may be linear, such that the beam emitter 106 moves in straight lines. Alternatively, the track may be curved and/or rotatable.

Optionally, although only the two source locations 314, 316 are described, the actuator 140 may be configured to move the beam emitter 106 to at least three discrete locations along the length of the track. For example, the actuator 140 may include a stepper motor or a gear assembly that allows the actuator 140 to stop at various set locations along the rail or gantry 144. In a non-limiting example, the actuator 140 may be able to selectively position the beam emitter 106 with a sufficiently high spatial frequency to enable positioning of the emitter 106 at approximately any location along the length of the track. According to one or more embodiments, the processors 118 may be configured to determine or select the beam source locations to which the beam emitter 106 is to be moved during the build process. The processors 118 may select the beam source locations based on the one or more geometrical characteristics, such as the angles of incidence. In a non-limiting example, the processors 118 may determine the angles of incidence of various geometric segments of the build part 302 with respect to each of three or more different prospective (e.g., available) source locations. The processors 118 may select which of the prospective source locations to use for forming each of the geometric segments based at least in part on a comparison of the angles of incidence. For example, the two source locations 314, 316 shown in FIG. 8 may be locations that are selected by the processors 118 from among three or more prospective source locations.

Figure 9:
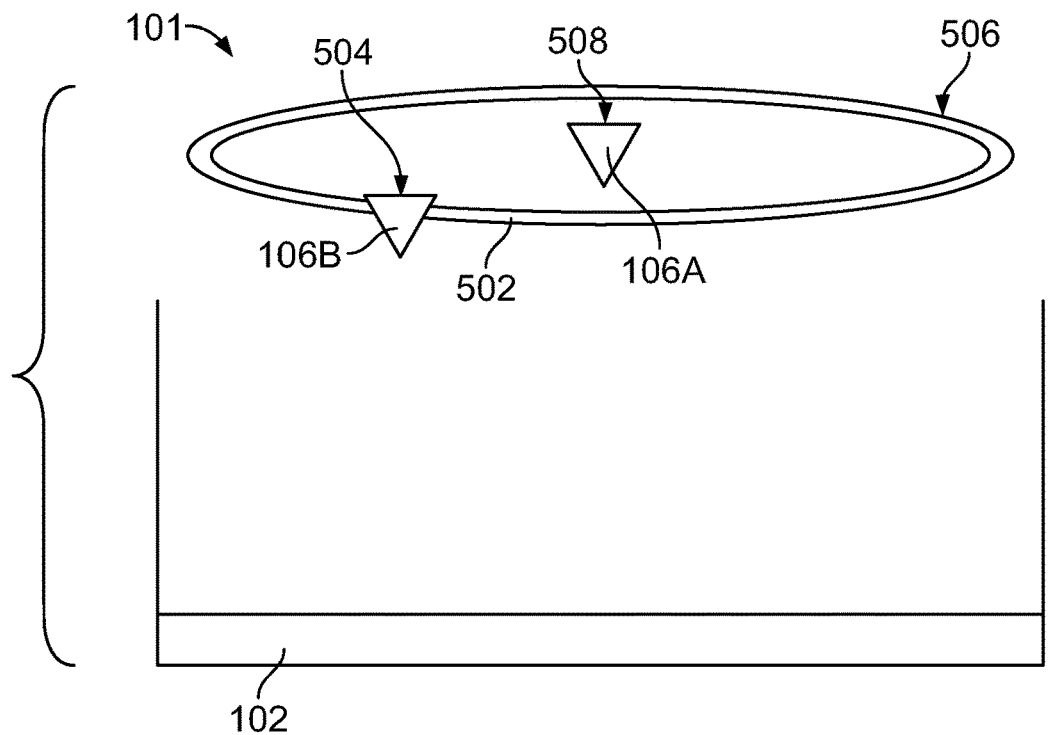
FIG. 9 illustrates a schematic diagram of the additive manufacturing instrument according to another embodiment of the present disclosure.

FIG. 9 illustrates a schematic diagram of the additive manufacturing (AM) instrument 101 according to a third embodiment of the present disclosure. In FIG. 9, the AM instrument 101 includes first and second beam emitters 106A, 106B, similar to the embodiment shown in FIG. 7. Unlike FIG. 7, the first beam emitter 106A is centered over the build platform 102. The first beam emitter 106A may be secured in a fixed position relative to the other components of the AM instrument 101, such that the first beam emitter 106A is non-translatable. The second beam emitter 106B is translatable relative to the platform 102, the first beam emitter 106A, and other components of the AM instrument 101. The second beam emitter 106B is mounted to a curved rail 502 and is movable along the length of the curved rail 502. The curved rail 502 may define a closed shape, such as a circle, oval, ellipse, rectangle with curved corners, or the like. The rail 502 may be annular or ring-shaped, although the rail 502 appears oval in the perspective view of FIG. 9. The curved rail 502 may surround the first beam emitter 106A.

In an embodiment, the second beam emitter 106B can be moved by an actuator to various locations along the length of the rail 502 from which to emit focused energy beams towards a build part on the platform 102. For example, the processors 118 may control the second beam emitter 106B to move between a first source location 504 and a second source location 506 along the rail 502 during a build process in order to change the source of the energy beams impinging upon the build part. Concurrently or consecutively, the processors 118 may control the first beam emitter 106A at the fixed, central location 508 (which represents a third source location) to emit focused energy beams towards the build part. The first beam emitter 106A may emit beams towards different segment(s) of the build part than the segment(s) aimed at by the second beam emitter 106B.

Figure 10:
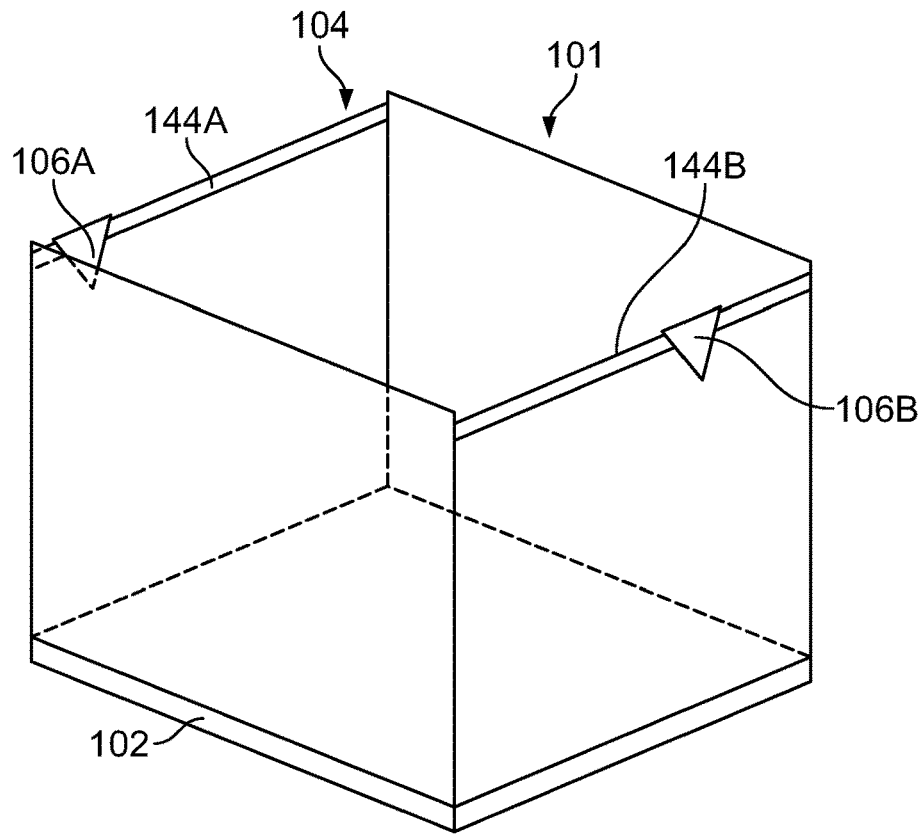
FIG. 10 illustrates a schematic diagram of the additive manufacturing instrument according to another embodiment of the present disclosure.

FIG. 10 illustrates a schematic diagram of the additive manufacturing (AM) instrument 101 according to a fourth embodiment of the present disclosure. The embodiment shown in FIG. 10 is similar to the embodiment shown in FIGS. 1 and 8 except that the AM instrument 101 includes two beam emitters 106A, 106B on two separate rails or gantries 144A, 144B. The rails 144A, 144B are disposed along opposite sides of the enclosure 104 above the platform 102. The first beam emitter 106A is selectively positionable at two or more locations along the length of the first linear rail or gantry 144A, and the second beam emitter 106B is selectively positionable at two or more locations along the length of the second linear rail or gantry 144B. Separate actuators (not shown) may be controlled by the processors 118 to move the beam emitters 106A, 106B to different locations.

In an alternative embodiment, at least one of the rails 144A, 144B is movable relative to the platform 102. For example, the rail 144A may be movable along another track that extends from the position of the rail 144A shown in FIG. 10 towards the position of the rail 144B in FIG. 10. The other track may extend perpendicular to the length of the track 144B. In yet another embodiment, the AM instrument 101 only includes a single rail 144A and beam emitter 106A (e.g., lacks the rail 144B and beam emitter 106B), and the rail 144A is movable as described above to enable locating the beam emitter 106A at the location of the beam emitter 106B shown in FIG. 10.

Figure 11:
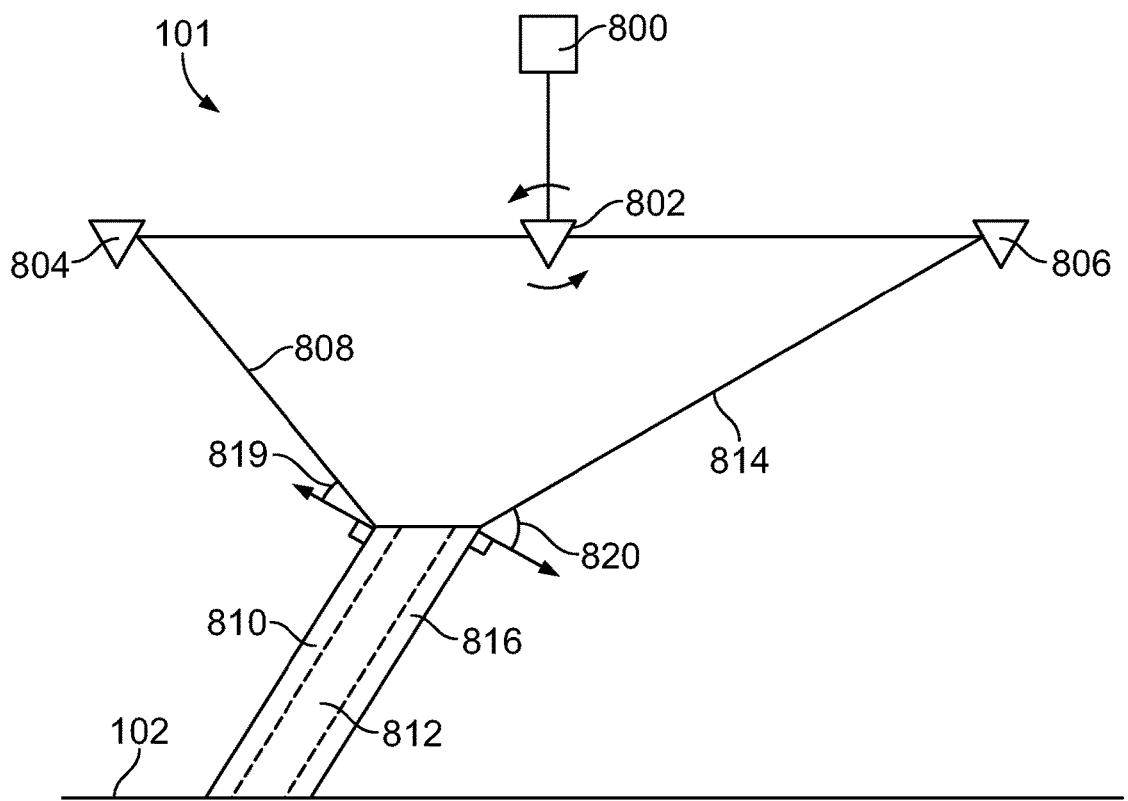
FIG. 11 illustrates the additive manufacturing instrument according to another embodiment utilizing optical components to change the orientation of focused energy beams relative to the build part.
Figure 12:
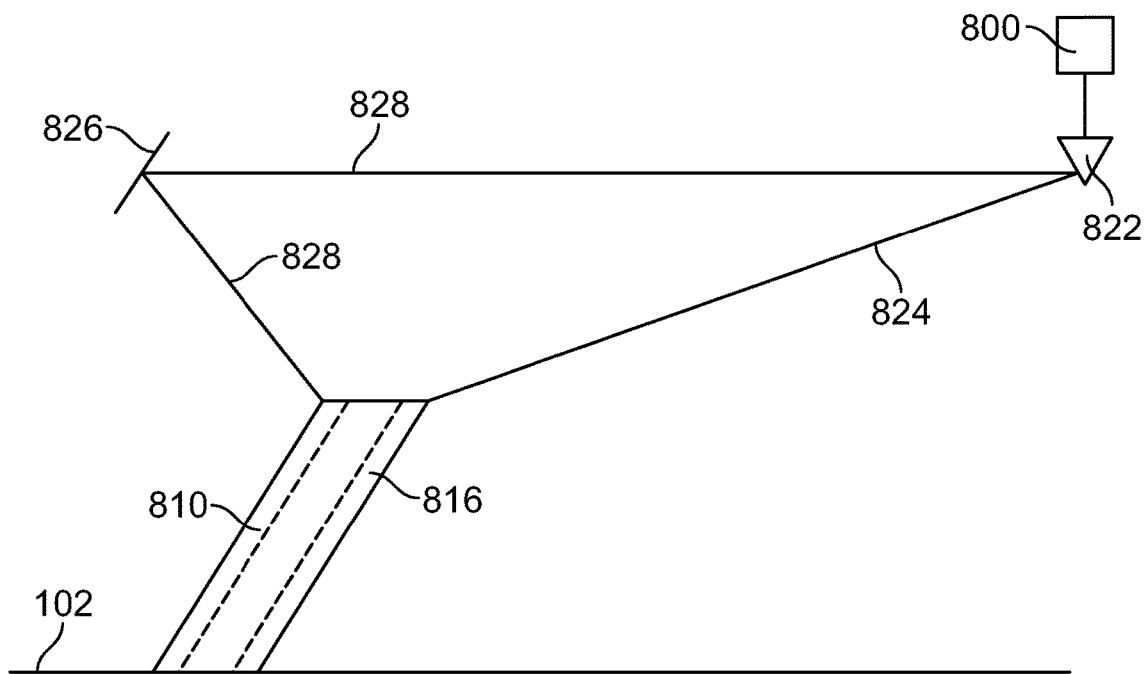
FIG. 12 illustrates the additive manufacturing instrument according to another embodiment that utilizes an optical component to change the orientation of focused energy beams relative to the build part.

FIGS. 11 and 12 illustrate the AM instrument 101 according to additional embodiments in which optical components are utilized to change the orientation of the focused energy beams relative to the build part. In both FIGS. 11 and 12, a single beam emitter 800 is utilized to generate focused energy beams. In FIG. 11, the beam source emitter 800 is operably coupled to a selector device 802, which may include or represent a transparent prism, a block having one or more reflective surfaces, or the like. The selector device 802 may be rotatable to change the orientation of the selector device 802 relative to the beam emitter 800. The AM instrument 101 in FIG. 11 also includes two scanning heads 804, 806. The scanning heads 804, 806 are spaced apart from each other and mounted above the platform 102. The scanning heads 804, 806 are configured to redirect focused energy beams 808 towards the platform 102. Each of the scanning heads 804, 806 may include one or more reflective surfaces, such as mirrors.

In operation, the beam emitter 800 emits an energy beam 808 towards the selector device 802. The selector device 802 redirects the beam 808 towards the first scanning head 804 or the second scanning head 806. For example, the selector device 802 may direct the beam 808 towards the first scanning head 804 in order for the first scanning head 804 to redirect the beam 808 towards an upskin segment 810 of the build part 812. The selector device 802 may direct a subsequent beam 814 towards the second scanning head 806 for the second scanning head 806 to redirect the beam 814 towards a downskin segment 816 of the build part 812. By changing the orientation of the beams, the angles of incidence 819, 820 associated with the beams 808, 814 are acute, indicating that both the upskin and downskin surfaces of the build part 812 classify as inskins.

In FIG. 12, the beam emitter 800 is directly coupled to a scanning head 822. The AM instrument 101 also includes a reflector 826 spaced apart from the beam emitter 800 and the scanning head 822. For example, the reflector 826 may be disposed along an opposite side, end, or corner of the build envelope or enclosure as the scanning head 822. The reflector 826 is oriented to reflect beams towards the platform 102. The scanning head 822 is able to selectively direct a first energy beam 824 directly towards the downskin segment 816 of the build part 812. The scanning head 822 can selectively direct a second energy beam 828 towards the reflector 826, which redirects the beam 828 towards the upskin segment 810 of the build part 812. Similar to the embodiment shown in FIG. 11, both the upskin and downskin surfaces of the build part 812 classify as inskins in FIG. 12.

Figure 13:
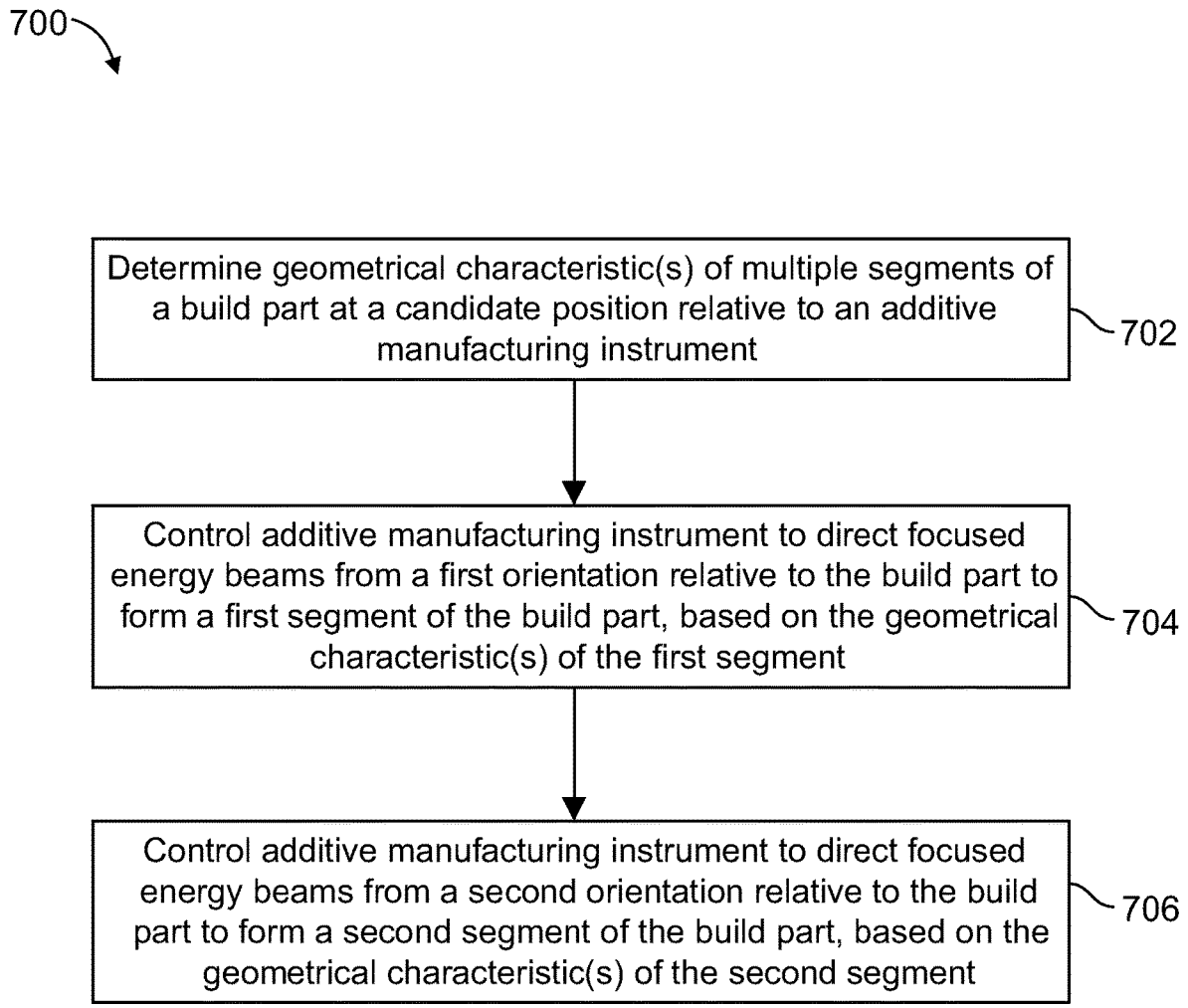
FIG. 13 is a flow chart of a method for additively manufacturing a build part during a build process by directing focused energy beams along multiple different beam orientations relative to the build part according to an embodiment of the present disclosure.

FIG. 13 is a flow chart of a method 700 for additively manufacturing a build part during a build process by directing focused energy beams from multiple different beam orientations relative to the build part for improving properties of the build part, such as surface and near-surface quality, porosity, and dimensional accuracy. The method 700 may be performed in whole, or at least in part, by the one or more processors 118 of the control unit 108 of the AM system 100 shown in FIG. 1. Optionally, some operator input can be provided in one or more of the steps. Optionally, the method 700 may include more steps than shown in FIG. 13, fewer steps than shown in FIG. 13, different steps that are not shown in FIG. 13, and/or a different arrangement or order of the steps than shown in FIG. 13.

The method 700 begins at 702, at which one or more geometrical characteristics of each of multiple segments of a build part are determined at a candidate position of the build part relative to an additive manufacturing instrument prior to additively manufacturing the build part. The one or more geometrical characteristics include an angle of incidence between a beam line extending from an electromagnetic energy source of an additive manufacturing instrument and a surface normal of a respective skin of the corresponding segment proximate to the beam line.

At 704, the additive manufacturing instrument is controlled to direct focused energy beams from a first orientation relative to the build part to form a first segment of the segments of the build part. Directing the focused energy beams from the first orientation is based on the one or more geometrical characteristics of the first segment. For example, directing the focused energy beams from the first orientation may be in response to determining that the angle of incidence defined by the beam line extending from the first orientation towards the first segment is acute. Furthermore, directing the focused energy beams from the first orientation to the first segment may be in response to determining that the angle of incidence defined by the beam line extending from the first orientation towards the first segment is less than the angle of incidence defined by a beam line extending from the second orientation towards the first segment.

At 706, the additive manufacturing instrument is controlled to direct focused energy beams from a second orientation relative to the build part to form a second segment of the segments of the build part. Directing the focused energy beams from the second orientation is based on the one or more geometrical characteristics of the second segment. of the first segment. For example, directing the focused energy beams from the second orientation may be in response to determining that the angle of incidence defined by the beam line extending from the second orientation towards the second segment is acute. Furthermore, directing the focused energy beams from the second orientation to the second segment may be in response to determining that the angle of incidence defined by the beam line extending from the second orientation towards the second segment is less than the angle of incidence defined by a beam line extending from the first orientation towards the second segment.

The AM instrument includes one or more beam emitters and one or more actuators controlled to move the one or more beam emitters between different source locations. In an embodiment, one of the actuators moves one beam emitter to a first source location, and the beam emitter at the first source location emits the focused energy beams to form the first segment of the build part. The actuator is controlled to move the (same) beam emitter to the second source location for the beam emitter to emit focused energy beams to form the second segment of the build part. Alternatively, a first beam emitter of multiple beam emitters is disposed at a first source location and is controlled to emit focused energy beams towards the first segment of the build part to form the first segment. A second beam emitter of the multiple beam emitter is disposed at a second source location and is controlled to emit focused energy beams towards the second segment of the build part to form the second segment. The first and second source locations are determined based on the one or more geometrical characteristics of the first and second segments, respectively.

While various spatial and directional terms, such as top, bottom, lower, mid, lateral, horizontal, vertical, front and the like are used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

The diagrams of embodiments herein illustrate one or more control or processing units, such as the control unit 108 shown in FIG. 1. It is to be understood that the control or processing units represent circuits, circuitry, or portions thereof that are implemented as hardware with associated instructions (e.g., software stored on a tangible and non-transitory computer readable storage medium, such as a computer hard drive, ROM, RAM, or the like) that perform the operations described herein. The hardware can include state machine circuitry hardwired to perform the functions described herein. The hardware can include electronic circuits that include and/or are connected to one or more logic-based devices, such as microprocessors, processors, controllers, or the like. Optionally, the control unit 108, or the one or more processors 118 thereof, represents processing circuitry such as one or more of a field programmable gate array (FPGA), application specific integrated circuit (ASIC), microprocessor(s), a quantum computing device, and/or the like. The circuits in various embodiments are configured to execute one or more algorithms to perform functions described herein. The one or more algorithms include aspects of embodiments disclosed herein, whether or not expressly identified in a flowchart or a method.

As used herein, the term "control unit," or the like includes any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only and are thus not intended to limit in any way the definition and/or meaning of such terms. The control unit 108 shown in FIG. 1 is configured to execute a set of instructions that are stored in one or more storage elements (such as one or more memories), in order to process data. The set of instructions includes various commands that instruct the control unit 108 (e.g., the processor(s) 118 thereof) as a processing machine to perform specific operations such as the methods and processes of the various embodiments of the subject matter described herein. In an embodiment, the set of instructions is in the form of a software program. The processing of input data by the processing machine is in response to user commands, in response to results of previous processing, or in response to a request made by another processing machine. As used herein, the term "software" includes any computer program stored in memory for execution by a computer, including but not limited to RAM memory, ROM memory, EPROM memory, EEPROM memory, and non-volatile RAM (NVRAM) memory.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are example embodiments. Many other embodiments will be apparent to those of ordinary skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those of ordinary skill in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An additive manufacturing system comprising:
one or more processors configured to determine one or more geometrical characteristics of each of multiple segments of a build part at a candidate position relative to an additive manufacturing instrument, wherein the one or more geometrical characteristics, for each corresponding segment of the segments, includes an angle of incidence between (i) a beam line extending from a source of focused energy beams to a surface layer of the build part at the corresponding segment and (ii) a surface normal vector of a respective skin of the corresponding segment proximate to the beam line, wherein the skin of the corresponding segment is a side surface of one or more layers of the build part immediately below the surface layer,
wherein the one or more processors are configured to control the additive manufacturing instrument, based on the one or more geometrical characteristics including the angle of incidence, to direct the focused energy beams from a first orientation relative to the build part to form a first segment of the segments of the build part in response to determining that the angle of incidence defined by the beam line extending from the first orientation towards the first segment of the build part is acute, and wherein the one or more processors are configured to control the additive manufacturing instrument, based on the one or more geometrical characteristics including the angle of incidence, to direct the focused energy beams from a second orientation relative to the build part to form a second segment of the segments of the build part.

2. The additive manufacturing system of claim 1, wherein the one or more processors are configured to generate a build plan based on the one or more geometrical characteristics, wherein the build plan designates operations to be performed by the additive manufacturing instrument to form the build part.

3. The additive manufacturing system of claim 1, wherein the one or more processors control the additive manufacturing instrument to direct the focused energy beams from the first orientation to form the first segment in response to determining that the angle of incidence defined by the beam line extending from the first orientation towards the first segment of the build part is less than the angle of incidence defined by a beam line extending from the second orientation towards the first segment of the build part.

4. The additive manufacturing system of claim 1, wherein the one or more processors control the additive manufacturing instrument to direct the focused energy beams from the second orientation to form the second segment of the build part in response to determining that the angle of incidence defined by the beam line extending from the second orientation towards the second segment of the build part is acute.

5. The additive manufacturing system of claim 1, wherein the one or more processors are configured to control the additive manufacturing instrument to direct the focused energy beams from a first source location to the first segment of the build part and to direct the focused energy beams from a second source location to the second segment of the build part, the first and second source locations being spaced apart from each other relative to the additive manufacturing instrument.

6. The additive manufacturing system of claim 5, wherein the first and second source locations are disposed at opposite corners or opposite sides of the additive manufacturing instrument.

7. The additive manufacturing system of claim 1, wherein the one or more processors are configured to control the additive manufacturing instrument to form the first segment of the build part by controlling a first beam emitter to emit the focused energy beams from the first orientation towards the first segment, and
wherein the one or more processors are configured to control the additive manufacturing instrument to form the second segment of the build part by controlling a second beam emitter to emit the focused energy beams from the second orientation towards the second segment.

8. The additive manufacturing system of claim 7, wherein a coverage area of the first beam emitter along the additive manufacturing instrument overlaps a coverage area of the second beam emitter.

9. The additive manufacturing system of claim 1, wherein the additive manufacturing instrument includes a beam emitter and an actuator, wherein the actuator is configured to move the beam emitter relative to the build part between a first source location and a second source location, and
wherein the one or more processors are configured to control the actuator to position the beam emitter at the first source location for emitting the focused energy beams to form the first segment of the build part and to position the beam emitter at the second source location for emitting the focused energy beams to form the second segment of the build part.

10. The additive manufacturing system of claim 9, wherein the beam emitter is movable along a track, and the track is moveable relative to a platform of the additive manufacturing instrument.

11. The additive manufacturing system of claim 9, wherein the beam emitter is movable along a track, and the track is linear.

12. The additive manufacturing system of claim 9, wherein the beam emitter is movable along a track, and the track is curved.

13. The additive manufacturing system of claim 9, wherein the beam emitter is a first beam emitter and the additive manufacturing instrument further includes a second beam emitter, wherein the one or more processors are configured to control the second beam emitter to emit focused energy beams from a third source location, spaced apart from the first and second source locations relative to the, to form a third segment of the build part.

14. A method comprising:
determining one or more geometrical characteristics of each of multiple segments of a build part at a candidate position relative to an additive manufacturing instrument prior to additively manufacturing the build part, wherein the one or more geometrical characteristics, for each corresponding segment of the segments, includes an angle of incidence between (i) a beam line extending from a source of focused energy beams to a surface layer of the build part at the corresponding segment and (ii) a surface normal vector of a respective skin of the corresponding segment proximate to the beam line, wherein the skin of the corresponding segment is a side surface of one or more layers of the build part immediately below the surface layer;
controlling the additive manufacturing instrument, based on the one or more geometrical characteristics including the angle of incidence, to direct focused energy beams from a first orientation relative to the build part to form a first segment of the segments of the build part in response to determining that the angle of incidence defined by the beam line extending from the first orientation towards the first segment of the build part is acute; and
controlling the additive manufacturing instrument, based on the one or more geometrical characteristics including the angle of incidence, to direct focused energy beams from a second orientation relative to the build part to form a second segment of the segments of the build part.

15. The method of claim 14, wherein the controlling of the additive manufacturing instrument to direct the focused energy beams from the second orientation relative to the build part is responsive to determining that the angle of incidence defined by the beam line extending from the second orientation towards the second segment is acute.

16. The method of claim 14, wherein the controlling of the additive manufacturing instrument to direct the focused energy beams from the first orientation is responsive to determining that the angle of incidence defined by the beam line extending from the first orientation towards the first segment is less than the angle of incidence defined by a beam line extending from the second orientation towards the first segment.

17. The method of claim 14, wherein the additive manufacturing instrument includes a beam emitter and an actuator, and the method further comprises controlling the actuator to move the beam emitter between a first source location and a second source location such that the beam emitter at the first source location emits the focused energy beams to form the first segment of the build part and the beam emitter at the second source location emits the focused energy beams to form the second segment.

18. The method of claim 14, wherein the controlling of the additive manufacturing instrument to direct the focused energy beams from the first orientation includes controlling a first beam emitter disposed at a first source location to emit the focused energy beams towards the first segment, and the controlling of the additive manufacturing instrument to direct the focused energy beams from the second orientation includes controlling a second beam emitter disposed at a second source location to emit the focused energy beams towards the second segment.

19. An additive manufacturing system comprising:
an additive manufacturing instrument that includes a platform and one or more beam emitters, the one or more beam emitters configured to emit focused energy beams from multiple different source locations relative to the platform; and
one or more processors configured to determine one or more geometrical characteristics of each of multiple segments of a build part at a candidate position relative to the additive manufacturing instrument, wherein the one or more geometrical characteristics, for each corresponding segment of the segments, includes an angle of incidence between (i) a beam line extending from a corresponding one of the source locations to a surface layer of the build part at the corresponding segment and (ii) a surface normal vector of a respective skin of the corresponding segment proximate to the beam line, wherein the skin of the corresponding segment is a side surface of one or more layers of the build part immediately below the surface layer, wherein the one or more processors are configured to control the one or more beam emitters, based on the one or more geometrical characteristics including the angle of incidence, to direct the focused energy beams from a first source location relative to the platform to form a first segment of the segments of the build part in response to determining that the angle of incidence defined by the beam line extending from the first source location towards the first segment of the build part is acute, and wherein the one or more processors are configured to control the one or more beam emitters, based on the one or more geometrical characteristics including the angle of incidence, to direct the focused energy beams from a second source location relative to the platform to form a second segment of the segments of the build part.

20. The additive manufacturing system of claim 1, wherein the one or more processors are configured to control the additive manufacturing instrument to direct the focused energy beams from the first orientation to form the first segment in response to determining that the angle of incidence defined by the beam line extending from the first orientation towards the first segment is both (i) acute and (ii) less than a second angle of incidence defined by the beam line extending from the second orientation towards the first segment.

21. The method of claim 14, wherein the additive manufacturing instrument is controlled to direct the focused energy beams from the first orientation to the build part to form the first segment in response to determining that the angle of incidence defined by the beam line extending from the first orientation towards the first segment is both (i) acute and (ii) less than a second angle of incidence defined by the beam line extending from the second orientation towards the first segment.

* * * * *